United States Patent
Bardalai

(10) Patent No.: US 8,218,968 B2
(45) Date of Patent: Jul. 10, 2012

(54) SYSTEM AND METHOD FOR DISCOVERING NEIGHBORING NODES

(75) Inventor: Snigdho Chandra Bardalai, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 871 days.

(21) Appl. No.: 11/764,507

(22) Filed: Jun. 18, 2007

(65) Prior Publication Data

US 2008/0107415 A1 May 8, 2008

Related U.S. Application Data

(60) Provisional application No. 60/829,627, filed on Oct. 16, 2006.

(51) Int. Cl.
*H04B 10/20* (2006.01)
*H04B 17/00* (2006.01)
*H04J 14/00* (2006.01)
*H04L 12/26* (2006.01)

(52) U.S. Cl. ............ 398/57; 398/2; 398/25; 398/156; 370/248

(58) Field of Classification Search ......... 398/2–5, 398/9, 25, 57, 156; 370/248
See application file for complete search history.

(56) References Cited

U.S. PATENT DOCUMENTS

| | | | |
|---|---|---|---|
| 5,646,936 A | 7/1997 | Shah et al. | 370/228 |
| 5,859,959 A | 1/1999 | Kimball et al. | 395/182.02 |
| 6,701,448 B1 | 3/2004 | Akyol et al. | 714/4 |
| 6,718,387 B1 | 4/2004 | Gupta et al. | 709/226 |
| 6,738,624 B1 | 5/2004 | Aksentijevic et al. | 455/452.1 |
| 6,973,028 B1 * | 12/2005 | Huai et al. | 370/222 |
| 7,174,387 B1 | 2/2007 | Shand et al. | 709/238 |
| 7,269,132 B1 | 9/2007 | Casey et al. | 370/219 |
| 2003/0137932 A1 | 7/2003 | Nishioka et al. | 370/216 |
| 2004/0015590 A1 | 1/2004 | Nagami et al. | 709/227 |
| 2004/0057724 A1 | 3/2004 | Oksanen et al. | 398/5 |
| 2004/0114922 A1 * | 6/2004 | Hardee | 398/17 |
| 2004/0120705 A1 | 6/2004 | Friskney et al. | 398/5 |
| 2005/0089027 A1 | 4/2005 | Colton | 370/380 |
| 2005/0232263 A1 * | 10/2005 | Sagara | 370/389 |
| 2006/0092932 A1 | 5/2006 | Ghosh et al. | 370/389 |
| 2007/0071442 A1 * | 3/2007 | Lu | 398/59 |
| 2007/0198710 A1 | 8/2007 | Gopalakrishnan | 709/225 |
| 2008/0008168 A1 | 1/2008 | Nadeau et al. | 370/389 |
| 2008/0069004 A1 * | 3/2008 | Huff | 370/248 |
| 2008/0101413 A1 | 5/2008 | Bardalai et al. | 370/474 |
| 2008/0112322 A1 | 5/2008 | Bardalai | 370/235 |
| 2008/0170857 A1 | 7/2008 | Bardalai | 398/59 |
| 2008/0219156 A1 | 9/2008 | Caviglia et al. | 370/228 |

OTHER PUBLICATIONS

RFC 4204—Link Management Protocol (LMP), Oct. 2005 [online], [retrieved on Jun. 24, 2011]. Retrieved from the Internet <URL: http://tools.ietf.org/html//rfc4204>.*

(Continued)

*Primary Examiner* — Nathan Curs
(74) *Attorney, Agent, or Firm* — Baker Botts L.L.P.

(57) ABSTRACT

A method for discovering neighboring nodes includes establishing a first optical connection with a first node using a first link. The method also includes detecting a change in the first optical connection. The method further includes initiating a discovery process to detect whether the first node or a second node is using the first link. The method additionally includes, upon detecting a second node using the first link, disabling the first optical connection and establishing a second optical connection with the second node.

15 Claims, 2 Drawing Sheets

OTHER PUBLICATIONS

RFC 4209—Link Management Protocol (LMP) for Dense Wavelength Division Multiplexing (DWDM) Optical Line Systems, Oct. 2005 [online], [retrieved on Jun. 24, 2011]. Retrieved from the Internet <URL: http://www.faqs.org/rfcs/rfc4209.html>.*

Data Channel Status Confirmation Extensions for the Link Management Protocol; Li et al.; Network Working Group, Internet Draft, Jun. 2006 [online], [retrieved on Nov. 10, 20011 from the Internet <URL: http://tools.ietf.org/html/draft-li-ccamp-confirm-data-channel-status-00>.*

Ohuchi, et al., Metro SONET System Supporting Optical Backbone Infrastructure: FLASHWAVE 4500, *Fujitsu Sci. Tech. J.*, 42,4, p. 454-459 (Oct. 2006).

*SONET Telecommunications Standard Primer*, www.tektronix.com/optical, 2001.

Berger, L., Editor, Editor, *Generalized Multi-Protocol Label Switching (GMPLS) Signaling Resources ReserVation Protocol-Traffic Engineering (RSVP-TE) Extensions*; Movaz Networks, Jan. 2003. Network Working Group, Request for Comments: 3473, Category: Standards Track.

Lang, J., *Link Management Protocol (LMP)*, Sonos, Inc., Oct. 2005. Network Working Group, Request for Comments: 4204, Category: Standards Track.

Bardalai, et al., *System and Method for Providing Support for Multiple Control Channels*, U.S. Appl. No. 11/763,930, filed Jun. 15, 2007.

Bardalai, *System and Method for Rejecting a Request to Alter a Connection*, U.S. Appl. No. 11/764,525, filed Jun. 18, 2007.

Bardalai, *System and Method for Establishing Protected Connections*, U.S. Appl. No. 11/852,580, filed Sep. 10, 2007.

* cited by examiner

SYSTEM AND METHOD FOR DISCOVERING NEIGHBORING NODES

CROSS REFERENCE TO RELATED APPLICATIONS

This application claims the benefit of priority under 35 U.S.C. §119(e) of U.S. Provisional Application Ser. No. 60/829,627 filed Oct. 16, 2006, entitled Method and System for Discovering Neighbors Using Link Management Protocol Upon Network Configuration.

TECHNICAL FIELD

This invention relates generally to the field of communication networks and more specifically to a system and method for discovering neighboring nodes.

BACKGROUND

An optical network uses optical signals to communicate information among the nodes of the network. This information often includes both data (e.g., a file that is being downloaded, packets carrying voices of a phone call, or the contents of a webpage) and signaling (e.g., commands or messages between nodes containing status or setup information). In some optical networks the data may be transferred using a data channel (e.g., a datalink) while the signaling is communicated using a control channel. The connections that carry both the data and the signaling may at times need to be modified, replaced, or rerouted to different nodes. Unfortunately, the Link Management Protocol (LMP) does not currently detect a need to reconfigure a neighbor if a connection exists over the link (e.g., the link has been rerouted from one node to another) or if LMP graceful restart has been enabled. This may create traffic misconnection and stranded resources.

SUMMARY OF THE DISCLOSURE

Particular embodiments provide a system and method for detecting neighboring nodes that substantially eliminates or reduces at least some of the disadvantages and problems associated with previous methods and systems.

In accordance with a particular embodiment, a method for discovering neighboring nodes includes establishing a first optical connection with a first node using a first link. The method also includes detecting a change in the first optical connection. The method further includes initiating a discovery process to detect whether a node is using the first link. The method additionally includes, upon detecting a second node using the first link, disabling the first optical connection and establishing a second optical connection with the second node.

In some embodiments, initiating the discovery process comprises initiating a Link Management Protocol (LMP) discovery process. In certain embodiments, disabling the first optical connection comprises releasing at least one resource associated with the first optical connection. In particular embodiments, detecting a change in the first optical connection comprises transmitting a link verification message.

In accordance with another embodiment, a system for discovering neighboring nodes, comprises an interface operable to establish a first optical connection with a first node using a first link. The interface is also operable to detect a change in the first optical connection. The system also includes a processor coupled to the interface and operable to initiate a discovery process to detect whether a node is using the first link. The processor is further operable to, upon detecting a second node using the first link, disable the first optical connection and establish a second optical connection with the second node.

Technical advantages of particular embodiments include allowing a node to disable a first optical connection with a first node and establish a second optical connection with a second node using the same link. Accordingly, a node may prevent stranding resources associated with first node upon the link used by the first node being rewired to the second node.

Certain embodiments of the invention may include all, some, or none of the above technical advantages. One or more other technical advantages may be readily apparent to one skilled in the art from the figures, descriptions, and claims included herein.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
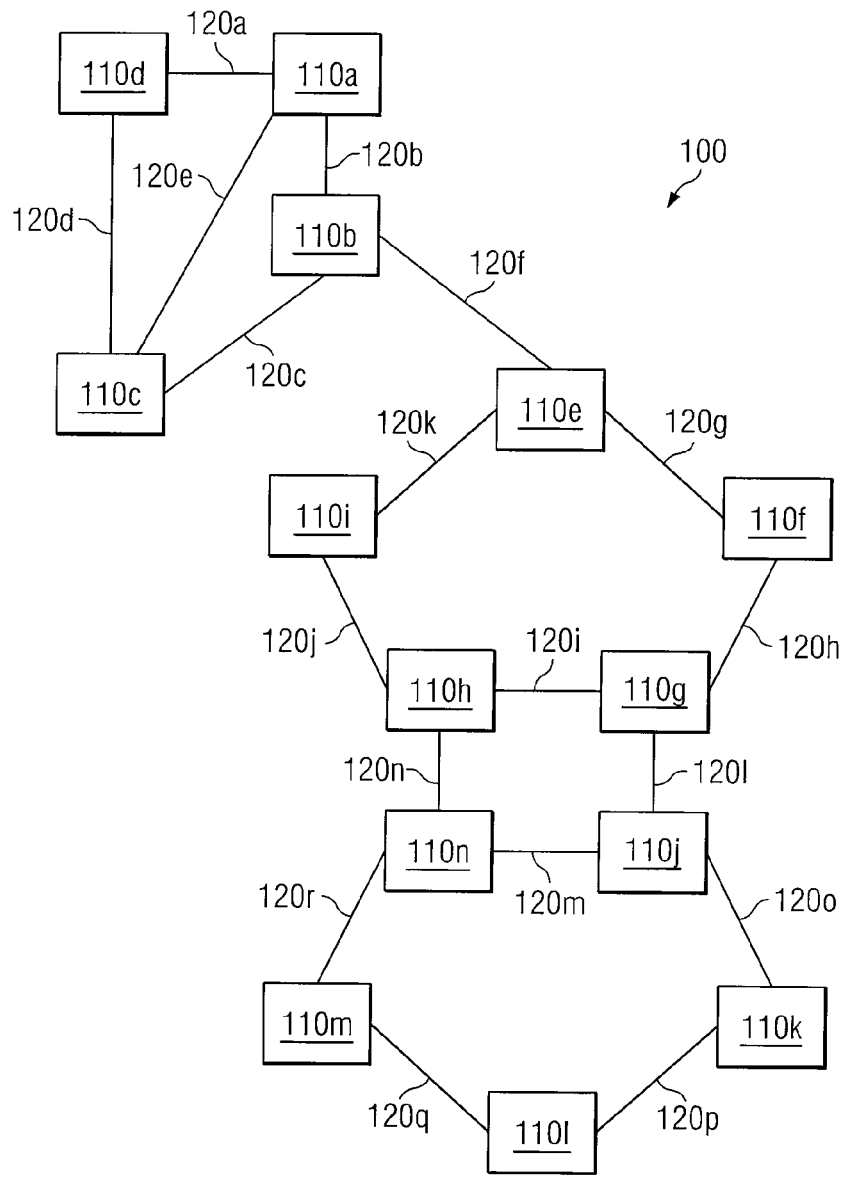
FIG. 1 is a block diagram illustrating an example embodiment of an optical network.

FIG. 1 is a block diagram illustrating an example embodiment of an optical network. Network 100 is comprised of several network entities or nodes 110 physically coupled to one another via links 120. Nodes 110 may communicate both data (e.g., files or WebPages) and signaling (e.g., control messages, routing messages, and link management messages) between each other using links 120. Data and signaling may be referred to collectively as messages. Links 120 may provide a physical medium over which two nodes may establish a connection. A connection may be a pairing or association between the interfaces of two nodes. In some embodiments, the connection may comprise both a control channel and a link property. These two components may need to be successfully correlated for a connection to be established. Nodes 110 and links 120 are arranged in two different topologies that are connected to one another via nodes 110b and 110e and link 120f. More specifically, nodes 110a-110d are arranged in a mesh network and nodes 110e-110i and 110j-110n are arranged in two different ring networks.

During the life of network 100 various nodes 110 or links 120 may be modified, damaged, destroyed, upgraded, reconfigured, replaced or otherwise altered. Certain embodiments allow a node to detect a reconfiguration event using the Link Management Protocol (LMP), even if a current connection exists over the link. The reconfiguration event may comprise any change to link 120, such as any of the alterations listed above, or any change to the node at the other end of a particular link. For example, a reconfiguration event may occur where link 120f is disconnected from node 110e and connected to node 110f. Furthermore, particular embodiments may not only allow the node to detect the reconfiguration event, but may also allow the node to disable the old connection. Once the old connection has been disabled, any resources associated with it may be released. This may prevent these resources from being stranded.

Network 100 may utilize any of a variety of different protocols to establish connections and route messages between nodes 110. For example, network 100 may use LMP, Generalized Multiprotocol Label Switching (GMPLS), Resource Reservation Protocol-Traffic Engineering (RSVP-TE), synchronous transport signal (STS) and/or Resilient Packet Ring (RPR) protocols. More specifically, GMPLS may be used to set up connections over mesh networks using the concept of label swapping, RSVP-TE may be used to establish label switched paths between nodes 110, and the RPR protocol may be used to transport messages in a ring network with messages being added, passed through, or dropped at each node 110. According to some embodiments, network 100 may utilize any suitable transmission technique, such as Ethernet, Synchronous Optical Network (SONET), or wavelength division multiplexing (WDM) techniques (e.g. dense wavelength division multiplexing (DWDM)). In some embodiments, network 100 may communicate messages in packets. A packet may comprise a bundle of data organized in a specific way for transmission. A packet may carry any suitable information such as voice, data, audio, video, multimedia, control, signaling, other information, or any combination of the preceding. The packets may comprise any suitable multiplexed packets, such as time division multiplexed (TDM) packets. One or more packets may be organized within a frame in a specific way for transmission.

Packets or frames may be communicated within portions of network 100 using an optical signal transmitted as light pulses. As an example, an optical signal may have a frequency of approximately 1550 nanometers and a data rate of 10, 20, 40, or over 40 gigabits per second. These light pulses may travel through any type of fiber suitable to transmit a signal. According to one embodiment, the fiber may include an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber.

Network 100 may comprise, or be a part of, a local area network (LAN), a wide area network (WAN), a cellular network, a global distributed network such as the Internet, an Intranet, an Extranet, a radio network (RN), a CDMA network, a GSM network, a TDMA network, a satellite network or any other form of wireless or wireline networking.

Nodes 110 may include any suitable type of networking device such as a network entity, a cross connect, a database, a regenerating unit, a dense wavelength division multiplexer (DWDM), an access gateway, an endpoint, a softswitch server, a trunk gateway, an access service provider, an Internet service provider, or any other device or entity operable to route packets to, from or within network 100.

Modifications, additions, or omissions may be made to network 100 without departing from the scope of the invention. The components of network 100 may be integrated or separated according to particular needs. Moreover, the operations of network 100 may be performed by more, fewer, or other devices. Additionally, operations of network 100 may be performed using any suitable logic. As used in this document, "each" refers to each member of a set or each member of a subset of a set.

Figure 2:
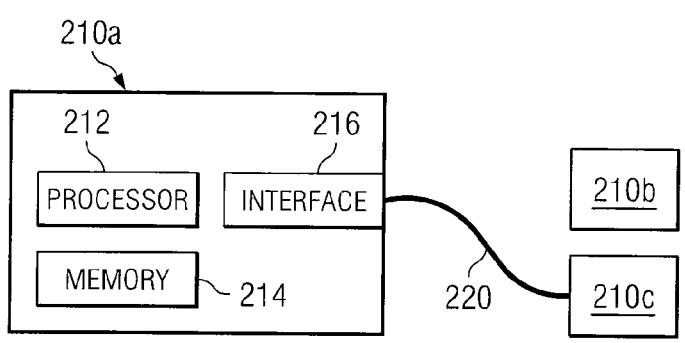
FIG. 2 is a block diagram illustrating an example embodiment of a node that has been rewired.

FIG. 2 is a block diagram illustrating an example embodiment of a node that has been rewired. Node 210*a* is physically coupled to node 210*c* after having been coupled to node 210*b*. Nodes 210*a* and 210*c* may be coupled via link 220. Nodes 210 may include any suitable type of networking device such as a network entity, a cross connect, a database, a regenerating unit, a dense wavelength division multiplexer (DWDM), an access gateway, an endpoint, a softswitch server, a trunk gateway, an access service provider, an Internet service provider, or any other device or entity operable to route packets to, from or between nodes 210. For simplicity, only node 210's internal components have been depicted. In other embodiments, node 210*a* may comprise more or fewer internal components, and one or more of the components may be external to node 210*a*. Though not depicted, nodes 210*b* and 210*c* may comprise similar components.

Processor 212 may be a microprocessor, controller, or any other suitable computing device, resource, or combination of hardware, software and/or encoded logic operable to provide, either alone or in conjunction with other node 210 components, such as memory 214 and interface 216, node functionality. Such functionality may include providing various features discussed herein to a network, such as network 100 of FIG. 1. Such features may include being able to differentiate between when link 220 or node 210*b* has been disconnected or otherwise becomes unavailable and when link 220 has been refibered to node 210*c*. This may allow processor 210*a* to determine whether to release the resource associated with node 210*b* or to hold onto them. For example, processor 212 may release the resources associated with node 210*b* to avoid having the resources stranded when link 220 is refibered to network work entity 210*c*.

Memory 214 may be any form of volatile or non-volatile memory including, without limitation, magnetic media, optical media, random access memory (RAM), read-only memory (ROM), removable media, or any other suitable local or remote memory component. Memory 214 may store any suitable instructions, data or information, including software and encoded logic, utilized by node 210*a*. For example, in some embodiments memory 214 may store information regarding the state of link 220 and the node to which it is connected. Memory 214 may also store the state of any connections node 210*a* has with other nodes (e.g., node 210*b* or 210*c*). This information may be stored as a finite state machine.

Interface 216 may be used in the communication of signaling and/or data with other nodes. For example, via interface 216 node 210 may receive a message comprising information related to the identification of node 210*b*. The number and type of interfaces 216 included with node 210 may be based on the number and type of networks to which node 210*a* is coupled. For example, node 210*a* may be coupled to an optical network and a broadcast network. In such a situation interface 216 may comprise a point-to-point optical interface and a broadcast network interface.

Link 220 may physically couple node 210*a* with node 210*b*. Link 220 may be similar to links 120 discussed above with respect to FIG. 1. Link 220 may provide a physical medium over which node 210 may establish a connection. In some embodiments, the connection may comprise both a control channel and a link property. These two components may need to be successfully correlated for a connection to be established. In particular embodiments, messages comprising data and/or signaling may be communicated between nodes 210 using an appropriate connection. For example, a message sent from node 210*a* to 210*c* may use the connection associated with network 210*c* and transmit the message over link 220. It should be noted that depending on the embodiment, and the protocols used, it may not be required that both the signaling and the data, of a particular connection, travel along the same path.

The following example is presented to provide a better understanding of how the components of node 210*a* may work to provide certain features of particular embodiments. This example is not intended to cover every scenario nor every feature, but rather to provide context with which to discuss certain features. For purposes of this example assume that nodes 210 are using Link Management Protocol (LMP). Further assume that at some point prior to the point in time depicted in FIG. 2, link 220 was used to couple node 210*a* with node 210*b*. It may also be assumed that link 220 may be used in establishing any connections between nodes 210*a* and 210*b* or 210*a* and 210*c*.

In some situations, the connection between nodes 210*a* and 210*b* may temporarily be lost. For example, link 220 may have experienced interference that temporarily caused the quality of the messages to deteriorate to the point of being unrecognizable, or node 210*b* may be performing administrative tasks (e.g., running a test) that prevent it from receiving messages. Upon interface 216 receiving an indication that the connection is not available, processor 212 may begin a timer. The timer may be set based on a desired amount of time to wait for the connection with node 210*b* to recover. The recovery interval may provide time for the old connection between nodes 210*a* and 210*b* to recover. In some embodiments, this may involve a graceful restart which may be performed in accordance with LMP standards. In those embodiments in which graceful restart is required the recovery interval may, for example, be set to infinity. If the interference that is temporarily causing messages to deteriorate is removed from node 210*b* and/or link 220 and the connection has recovered before the recovery interval has passed, then node 210*a* and 210*b* may initiate the graceful restart process and send messages to each other.

In some situations the connection between nodes 210*a* and 210*b* may be permanently lost. For example, link 220 may have been accidentally cut, or node 210*b* may have been unplugged and removed. It should be noted that permanent loss does not necessarily mean lost forever without a chance for recovery, but rather that the connection is lost at least for as long the recovery interval. Once the recovery interval has lapsed without recovery (e.g., the connection was not able to successfully correlate the control channel and the link property) of the connection between nodes 210*a* and 210*b*, processor 212 may update the corresponding finite state machines within memory 214. More specifically, processor 212 may update the finite state machines associated with node 210*b* that may be stored in memory 214 so that they show the connection is in a DOWN state. The DOWN state may indicate that node 210*b* or link 220 is down and thus unable to receive messages via link 220.

In certain situations, such as the one depicted in FIG. 2 and discussed in more detail below, link 220 may be neither permanently lost nor connected to the original node (e.g., node 210*b*) but rather may be refibered to node 210*c*. Accordingly, in some situations, node 210*a* may not initiate a graceful restart nor transition the finite state machine to the DOWN state but rather may, upon detecting the reconfiguration event, initiate a discovery process to determine the identity of the new neighboring node (e.g., node 210*c*). Thus, particular embodiments may allow nodes 210 to be able to detect neighboring nodes even though link 220 is connected to a node while still allowing node 210*a* to perform graceful restarts should link 220 have remained connected to node 210*b*.

In the scenario depicted in FIG. 2, link 220 has been reconnected to node 210*c*. This may be because a system administrator has decided to replace node 210*b* with node 210*c*. Unfortunately, because link 220 has been coupled to node 210*c* the current LMP specification may not provide a means for detecting the need to reconfigure node 210*a*'s neighbor relationship. More specifically, the LMP specification may only provide a way to detect a reconfiguration event if there is not a connection over link 220 (e.g., where link 220 has been severed). Thus, under the current LMP specification interface 216 would transmit messages to node 210*c* having an address associated with node 210*b*. When the messages are ultimately received at node 210*c*, they are ignored because the IP address does not match node 210*c*'s IP address. Accordingly, some embodiments may allow node 210*a* to detect neighboring nodes, even if link 220 is connected to a node, if a reconfiguration event is detected. In particular embodiments, the reconfiguration event may be detected by node 210*a* sending a link verification message. The link verification message is a message, specified in the LMP protocol, which allows information to be sent in the J0 bytes of a message.

To prevent interface 216 from trying to communicate with node 210*b* (e.g., repeatedly sending a Config message) particular embodiments may allow processor 212 and interface 216 to disable the connection with node 210*a*. This may release the resources associated with this older connection. Then processor 212 and interface 216 may work together to reconfigure the connection associated with link 220 so that a connection with node 210*c* may be established and properly configured.

It should be noted that processor 212 may not initiate the reconfiguration process simply upon the failure of link 220. Rather, processor 212 may wait until a new neighbor is detected before reconfiguring the connection. In some embodiments, processor 212 and interface 216 may work to debounce the detection process to attempt to minimize the amount of unnecessary toggling of the connection state. More specifically, LMP is prevented from completing the detection process until a certain period of time expires.

Figure 3:
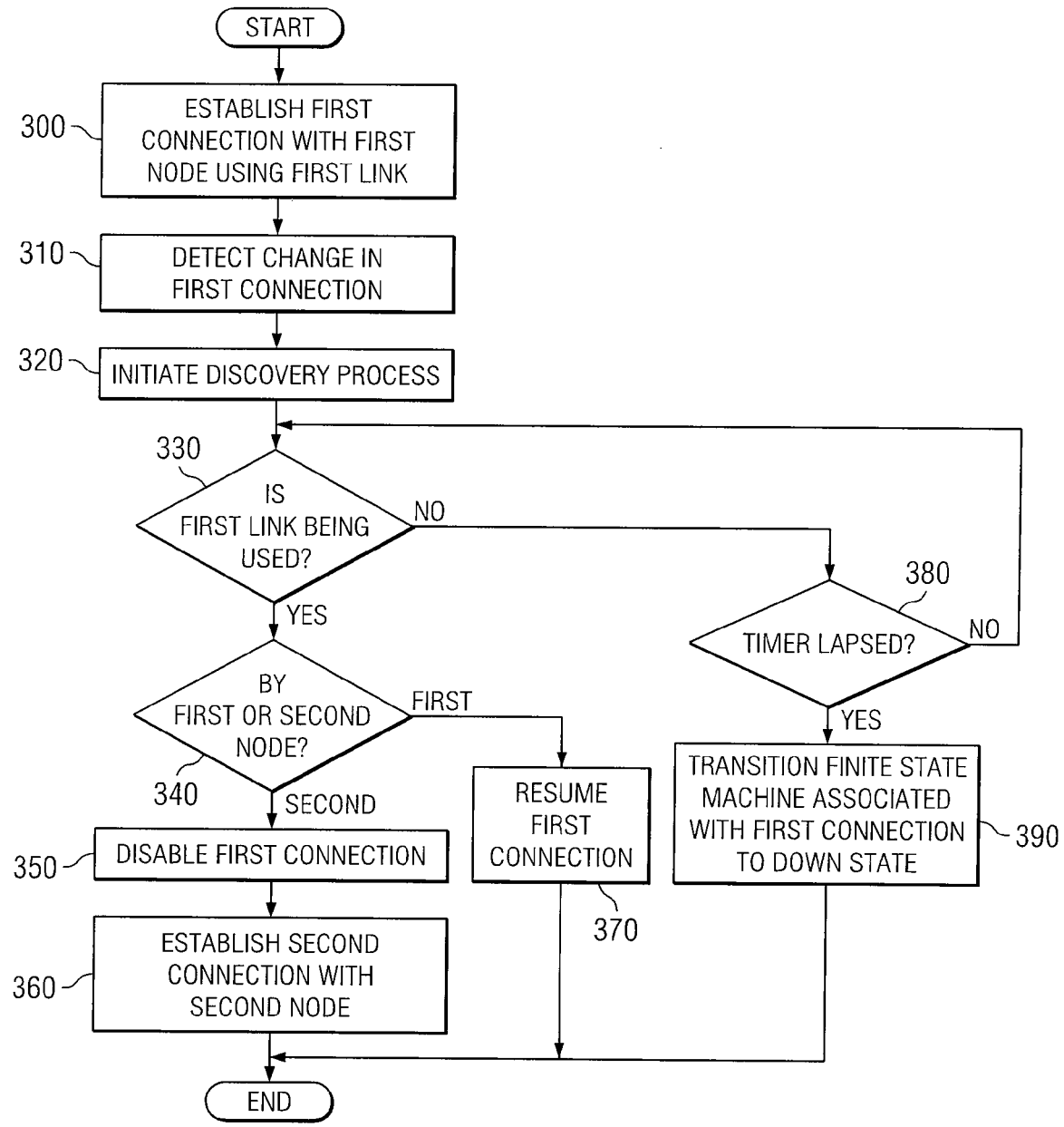
FIG. 3 is a flowchart illustrating an example embodiment of a system and method for discovering neighboring nodes.

FIG. 3 is a flowchart illustrating an example embodiment of a system and method for discovering neighboring nodes. The steps depicted in FIG. 3 are taken from the perspective of a particular node within an optical network (e.g., node 210*a* of FIG. 2). The nodes, links and connections referenced in the following discussion and included in the flowchart depicted in FIGURE may be similar to the any of the nodes, links or connections discussed above with respect to FIG. 1 or 2.

The method begins at step 300 where a first connection with a first node using a first link is established. The connection may be established using any of a variety of protocols depending on the embodiment, the situation and the capabilities and resources of the nodes. For example, in some embodiments the connection may be established using Link Management Protocol (LMP).

Then, at step 310 a change in the first connection is detected. The change may be the result of the first link becoming damaged, refibered or unplugged, or the first node may undergo a change or become unavailable, or any other circumstance or event that may effect the quality or functionality of the first connection. For example, the first link may be accidentally cut by a tractor digging a trench, or a network administrator may decide to refiber certain nodes within his network.

At step 320 a discovery process may be initiated. This may be used to determine if there is still a node at the other end of the first link and if so, what is the node's identity. In some embodiments the discovery process may involve using the LMP discovery process. At decision step 330 a determination is made as to whether the first link is being used. More specifically, if the link is coupled to a node and functioning properly then the link is being used; and if the link is damaged, severed, disconnected, or connected to a non-operational node, then the link is not being used. If it is determined that the first link is not being used then a timer may be started. The length of the timer may be based on the amount of time to wait before determining that the connection is down. The length of time may be set based on a desired recovery interval. At decision step 380 the timer is examined to determine if it has lapsed. If it has not lapsed then the link may be checked again to see if it is being used. Thus, decision steps 330 and 380 may be repeated as long as the link has not become available and the timer has not lapsed. Once the timer has lapsed without detecting the first link being used, at step 390 a finite state machine associated with the first connection is transitioned to a DOWN state. This indicates that the third connection is currently inoperable.

If at decision step 330 it is determined that the first link is being used, then at decision step 340 it is determined whether the first link is being used by the first node or a second node. If it is the same node, then at step 370 the first connection may be reestablished. In some embodiments this may involve a graceful restart.

If the first link is being used by a second node then a new connection may be needed. The first link may be used by a second node where, for example, the first node is being upgraded to a newer node or the optical network is being reconfigured. In order to successfully establish a connection with the second node the first connection may be disabled at step 350. By disabling the first connection it becomes less likely that the resources associated with the first node and/or the first connection become stranded.

At step 360 a second connection is established with the second node. Like the first connection, the second connection uses the first link. Once established the second connection may allow messages to be sent and received to and from the second node using the second connection.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for discovering neighboring nodes, comprising: establishing a first optical connection with a first node using a first link, wherein the first optical connection with the first node uses a communication protocol that is defined to detect a type of reconfiguration event in the first optical connection when no communication exists over the first link for longer than a defined recovery interval, the type of reconfiguration event comprising a change in a node that is using the first link;
   detecting a reconfiguration event of said type in the first optical connection while a connection exists over the first link before the defined recovery interval elapses;
   initiating a discovery process to detect whether the first node or a second node is using the first link; and
   upon detecting the second node using the first link, disabling the first optical connection and establishing a second optical connection with the second node, wherein disabling the first optical connection comprises releasing at least one resource associated with the first optical connection to prevent stranding of the resource.

2. The method of claim 1, wherein establishing the second optical connection comprises debouncing the second optical connection.

3. The method of claim 1, wherein the communication protocol comprises Link Management Protocol (LMP) and initiating the discovery process comprises initiating an LMP discovery process.

4. The method of claim 1, further comprising:
   initiating a timer set to a recovery interval; and
   upon lapse of the recovery interval without detection of the second node, transitioning a finite state machine associated with the first optical connection to a down state.

5. The method of claim 1, wherein detecting a change in the first optical connection comprises transmitting a link verification message.

6. A system for discovering neighboring nodes, comprising: an interface operable to:
   establish a first optical connection with a first node using a first link, wherein the first optical connection with the first node uses a communication protocol that is defined to detect a type of reconfiguration event in the first optical connection when no communication exists over the first link for longer than a defined recovery interval, the type of reconfiguration event comprising a change in a node that is using the first link; and
   detect a reconfiguration event of said type in the first optical connection while a connection exists over the first link before the defined recovery interval elapses; and
   a processor coupled to the interface and operable to:
   initiate a discovery process to detect whether the first node or a second node is using the first link; and
   upon detecting a second node using the first link, disable the first optical connection and establish a second optical connection with the second node, wherein disabling the first optical connection comprises releasing at least one resource associated with the first optical connection to prevent stranding of the resource.

7. The system of claim 6, wherein the processor operable to establish the second optical connection comprises a processor operable to debounce the second optical connection.

8. The system of claim 6, wherein the communication protocol comprises Link Management Protocol (LMP) and the processor operable to initiate the discovery process comprises a processor operable to initiate an LMP discovery process.

9. The system of claim 6, wherein the processor is further operable to:
   initiate a timer set to a recovery interval; and
   upon lapse of the recovery interval without detection of the second node, transition a finite state machine associated with the first optical connection to a down state.

10. The system of claim 6, wherein the processor operable to detect a change in the first optical connection comprises a processor operable to transmit a link verification message.

11. A non-transitory computer readable medium, the non-transitory computer readable medium comprising code operable when executed to:
    establish a first optical connection with a first node using a first link, wherein the first optical connection with the first node uses a communication protocol that is defined to detect a type of reconfiguration event in the first optical connection when no communication exists over the first link for longer than a defined recovery interval, the type of reconfiguration event comprising a change in a node that is using the first link;

detect a reconfiguration event of said type in the first optical connection while a connection exists over the first link before the defined recovery interval elapses;

initiate a discovery process to detect whether the first node or a second node is using the first link; and upon detecting a second node using the first link, disable the first optical connection and establish a second optical connection with the second node, wherein disabling the first optical connection comprises releasing at least one resource associated with the first optical connection to prevent stranding of the resource.

12. The medium of claim 11, wherein the code operable to establish the second optical connection comprises code operable to debounce the second optical connection.

13. The medium of claim 11, wherein the communication protocol comprises Link Management Protocol (LMP) and the code operable to initiate the discovery process comprises code operable to initiate an LMP discovery process.

14. The medium of claim 11, wherein the code is further operable to:

initiate a timer set to a recovery interval; and upon lapse of the recovery interval without detection of the second node, transition a finite state machine associated with the first connection to a down state.

15. The medium of claim 11, wherein the code operable to detect a change in the first optical connection comprises code operable to transmit a link verification message.

* * * * *